(12) United States Patent
Sasakura et al.

(10) Patent No.: US 11,123,709 B2
(45) Date of Patent: Sep. 21, 2021

(54) MOLDED ARTICLE

(71) Applicant: Mitsui Mining & Smelting Co., Ltd., Tokyo (JP)

(72) Inventors: Asuka Sasakura, Ageo (JP); Katsuhiko Hayashi, Ageo (JP); Atsushi Kurosaki, Ageo (JP); Masanori Sato, Ageo (JP); Kazuya Kinoshita, Ageo (JP); Takahito Asanuma, Ageo (JP); Seiji Moriuchi, Ageo (JP)

(73) Assignee: Mitsui Mining & Smelting Co., Ltd., Tokyo (JP)

( * ) Notice: Subject to any disclaimer, the term of this patent is extended or adjusted under 35 U.S.C. 154(b) by 78 days.

(21) Appl. No.: 16/480,418

(22) PCT Filed: Jan. 31, 2018

(86) PCT No.: PCT/JP2018/003200
§ 371 (c)(1),
(2) Date: Jul. 24, 2019

(87) PCT Pub. No.: WO2018/143269
PCT Pub. Date: Aug. 9, 2018

(65) Prior Publication Data
US 2019/0381481 A1    Dec. 19, 2019

(30) Foreign Application Priority Data

Jan. 31, 2017   (JP) .............................. JP2017-015596

(51) Int. Cl.
*B01J 20/06* (2006.01)
*B01J 20/28* (2006.01)
(Continued)

(52) U.S. Cl.
CPC ........... *B01J 20/3007* (2013.01); *B01J 20/06* (2013.01); *B01J 20/2803* (2013.01);
(Continued)

(58) Field of Classification Search
CPC .................. B01J 20/06; B01J 20/28004; B01J 20/28016; B01J 20/2803; B01J 20/28057;
(Continued)

(56) References Cited

U.S. PATENT DOCUMENTS

| 5,352,367 A | 10/1994 | Ochiai et al. |
| 8,029,754 B2 | 10/2011 | Nho et al. |

(Continued)

FOREIGN PATENT DOCUMENTS

| CN | 1894029 A | 1/2007 |
| CN | 1989075 A | 6/2007 |

(Continued)

OTHER PUBLICATIONS

Ding et al., "Effect of powder morphology on properties of porous alumina support", Membrane Science and Technology, 2001, pp. 17-21, vol. 21:2. (English-language Abstract on last page).

*Primary Examiner* — Cam N. Nguyen
(74) *Attorney, Agent, or Firm* — The Webb Law Firm (57) ABSTRACT

To provide a molded article which can have excellent strength, can also have high durability during repeated use, and can maintain high adsorption performance even when the content of a binder resin is reduced. A molded article containing cerium oxide particles and a binder resin, wherein cerium oxide particles which has an average particle diameter of 1 to 15 μm and in each of which a crystallite size is 40 to 200 Å are used.

15 Claims, 3 Drawing Sheets

(51) Int. Cl.
*B01J 20/30* (2006.01)
*B01J 20/32* (2006.01)
*C01F 17/00* (2020.01)
*C02F 1/42* (2006.01)
*G21F 9/12* (2006.01)
*C01F 17/235* (2020.01)

(52) U.S. Cl.
CPC ... *B01J 20/28004* (2013.01); *B01J 20/28016* (2013.01); *B01J 20/28057* (2013.01); *B01J 20/28085* (2013.01); *B01J 20/3014* (2013.01); *B01J 20/321* (2013.01); *B01J 20/3212* (2013.01); *C01F 17/235* (2020.01); *C02F 1/42* (2013.01); *G21F 9/12* (2013.01)

(58) Field of Classification Search
CPC .............. B01J 20/28085; B01J 20/3007; B01J 20/3014; B01J 20/321; B01J 20/3212; C01F 17/00; C02F 1/42; G21F 9/12
See application file for complete search history.

(56) References Cited

U.S. PATENT DOCUMENTS

| | | | |
|---|---|---|---|
| 8,349,764 B2* | 1/2013 | Burba, III | C02F 1/281 502/402 |
| 8,557,730 B2* | 10/2013 | Burba | C02F 1/281 502/402 |
| 8,597,778 B2 | 12/2013 | Omori et al. | |
| 8,796,171 B2 | 8/2014 | Fujimura et al. | |
| 8,809,229 B2* | 8/2014 | Burba | B01J 20/3042 502/402 |
| 9,205,422 B2 | 12/2015 | Hirai et al. | |
| 10,388,419 B2 | 8/2019 | Sakuma et al. | |
| 2008/0182930 A1* | 7/2008 | Adachi | B29C 66/73921 524/403 |
| 2010/0178471 A1* | 7/2010 | Adachi | B29C 66/73921 428/174 |
| 2012/0238683 A1 | 9/2012 | Burba | |
| 2014/0007773 A1 | 1/2014 | Burba | |

FOREIGN PATENT DOCUMENTS

| | | |
|---|---|---|
| CN | 107847902 A | 3/2018 |
| JP | H4317738 A | 11/1992 |
| JP | 5126995 A | 5/1993 |
| JP | 2000254116 A | 9/2000 |
| JP | 2009297707 A | 12/2009 |
| JP | 201241202 A | 3/2012 |
| JP | 2014213233 A | 11/2014 |
| WO | 2012096039 A1 | 7/2012 |
| WO | 2012147937 A1 | 11/2012 |

* cited by examiner

MOLDED ARTICLE

This application is the United States national phase of International Application No. PCT/JP2018/003200 filed Jan. 31, 2018, and claims priority to Japanese Patent Application No. 2017-015596 filed Jan. 31, 2017, the disclosures of which are hereby incorporated by reference in their entirety.

BACKGROUND OF THE INVENTION

Field of the Invention

The present invention relates to a molded article that can be used preferably as an adsorbent for iodate ions, and more specifically relates to a molded article which contains cerium oxide particles and a binder resin.

Background Art

In wastewater discharged from a nuclear reactor containment vessel or a pressure vessel in a nuclear power plant, radioactive iodine ions or radioactive iodine compounds (iodate ions) are contained. Therefore, it is not desirable to discharge the wastewater into rivers or sea without any treatment. For this reason, when the wastewater is discharged to the outside of a nuclear power plant, it is needed to remove radioactive nuclear species as mentioned above in the wastewater to a level equal to or lower than a regulatory value.

As the method for treating the wastewater, the following methods are known for example: a method in which iodate ions ($IO_3^-$) contained in the wastewater are reduced to produce iodine ions ($I^-$), then the iodine ions are brought into contact with silver zeolite or the like to produce silver iodide (AgI), and then the silver iodide is collected (Japanese Patent Laid-Open No. 5-126995); a method in which iodate ions are adsorbed using activated carbon (Japanese Patent Laid-Open No. 2000-254446); a method in which the wastewater is brought into contact with ion exchangeable fibers each having an amino group to remove iodine ions (WO No. 2012/147937 pamphlet); and a method in which a cerium compound, which is known as an adsorbent for selenium, boron, arsenic and the like, is used as an adsorbent for iodate ions, and other method (Japanese Patent Laid-Open No. 2009-297707, Japanese Patent Laid-Open No. 2014-213233).

Among the above-mentioned various methods, a cerium compound is a substance capable of specifically adsorbing iodate ions and can remove iodate ions at relatively low cost and in a simple manner, and therefore has attracted attention as a sewage treatment means for a nuclear power plant. For example, Japanese Patent Laid-Open No. 2009-297707 proposes an adsorbent which is formed into a porous molded article using an organic polymer resin as a binder for cerium oxide and has a large adsorption capacity and high durability. Japanese Patent Laid-Open No. 2014-213233 proposes an adsorbent in which cerium oxide is supported on activated carbon and is effective for the adsorptive removal of oxo acid ions (iodate ions) even when the amount of the supported cerium oxide is small.

PRIOR ART DOCUMENTS

Patent Documents

Patent Document 1: Japanese Patent Laid-Open No. H05-126995

Patent Document 2: Japanese Patent Laid-Open No. 2000-254446

Patent Document 3: WO No. 2012/147937 pamphlet

Patent Document 4: Japanese Patent Laid-Open No. 2009-297707

Patent Document 5: Japanese Patent Laid-Open No. 2014-213233

SUMMARY OF THE INVENTION

Problem to be Solved by the Invention

In Japanese Patent Laid-Open No. 2009-297707 mentioned above, it is taught that, although the adsorption capacity increases with the increase in the amount of cerium oxide supported, i.e., the content ratio of cerium oxide in the porous molded article, the strength of the molded article may become insufficient if the content of cerium oxide is too much. In this document, it is described that the preferred range of the amount to be supported is 65 to 95%, and a molded article in which cerium oxide is supported in an amount of 77% is actually used in a working example. As mentioned above, from the viewpoint of the adsorption performance, it is preferred that the binder resin on which cerium oxide is to be supported is contained in a smaller amount. However, if the content of the binder resin is small, the strength of the molded article may become insufficient or cerium oxide particles may not be dispersed in the molded article uniformly and may be aggregated, resulting in the deterioration in adsorption performance.

In these situations, the object of the present invention is to provide a molded article which can have excellent strength, can also have high durability during repeated use, and can maintain high adsorption performance even when the content of a binder resin is reduced.

Means for Solving Problem

The present inventors now find that, when cerium oxide particles each of which has a specified particle diameter and is composed of crystalline bodies each having a relatively large crystallite size are used in a molded article containing the cerium oxide particles and a binder resin, it becomes possible unexpectedly to provide a molded article which can have improved strength and excellent durability and can maintain adsorption performance for a longer period even when the content of the binder resin is reduced. This finding leads to the accomplishment of the present invention.

The molded article according to the present invention is a molded article containing cerium oxide particles and a binder resin, wherein an average particle diameter of the cerium oxide particles is 1 to 15 μm and a crystallite size in each of the cerium oxide particles is 40 to 200 Å.

In an embodiment of the present invention, it is preferred that each of the cerium oxide particles is a sintered body in which a plurality of crystalline bodies having shape anisotropy is bonded to each other three-dimensionally and randomly.

In an embodiment of the present invention, it is preferred that each of the crystalline bodies has a plate-like, scale-like, rod-like or needle-like shape.

In an embodiment of the present invention, it is preferred that the cerium oxide particles are contained in an amount of 90% by mass or more relative to the whole amount of the molded article.

The molded article according to a preferred embodiment of the present invention has a specific surface area of 100 to 200 m²/g.

The molded article according to a preferred embodiment of the present invention has an average pore diameter of 500 to 2000 nm.

The molded article according to a preferred embodiment of the present invention can be used as an adsorbent for iodate ions.

Advantageous Effect of the Invention

According to the present invention, a molded article which contains cerium oxide particles and a binder resin and which can have excellent strength and therefore can have high durability during repeated use and can maintain high adsorption performance even when the content of the binder resin is reduced can be provided by using, as the cerium oxide particles, cerium oxide particles which have an average particle diameter of 1 o 15 μm and in each of which a crystallite size is 40 to 200 Å.

MODE FOR CARRYING OUT THE INVENTION

The molded article according to the present invention contains cerium oxide particles and a binder resin. Firstly, the cerium oxide particles that constitute the molded article according to the present invention will be described.

<Cerium oxide particles>

The cerium oxide particles to be contained in the molded article according to the present invention have an average particle diameter of 1 to 15 μm, and a crystallite size in each of the cerium oxide particles is 40 to 200 Å. When cerium oxide particles having the above-mentioned specified form are used, even if the content of the binder resin in the molded article is reduced, it becomes possible to impart excellent strength to the molded article, and consequently it becomes possible to achieve high durability during repeated use and it also becomes possible to achieve high adsorption performance due to the high content of the cerium oxide particles in the molded article.

The term "average particle diameter" as used herein is defined as a particle diameter corresponding to a volume cumulative frequency of 50% as determined from a particle size distribution of all particles which is measured using a laser diffraction scattering particle size distribution measuring apparatus or the like. The crystallite size in each of the cerium oxide particles is defined as a value that is calculated in accordance with the Scherrer's equation shown below from a peak width (half width) of an X-ray diffraction peak on a crystal plane <111> when an X-ray diffraction intensity of a cerium oxide particle is measured in a measurement range of 20° to 150° using CuKα line.

$$D = K\lambda/\beta \cos\theta \quad \text{Scherrer's equation}$$

D: crystallite size
K: Scherrer constant (0.9400)
λ: wavelength of X-ray
β: half width [rad]
θ: diffraction angle In the present invention, from the viewpoint of making the above-mentioned effect of the present invention further significant, an average particle diameter of the cerium oxide particles is preferably in the range from 4 to 10 μm. The average particle diameter of the cerium oxide particles can be adjusted appropriately by altering an average particle diameter of a raw material powder, e.g., cerium carbonate, to be used for the production of the cerium oxide particles, the firing conditions, e.g., the firing temperature and the firing time, to be employed in the production of the cerium oxide particles, or the grinding conditions to be employed for the grinding (lump-breaking) of the cerium oxide particles. There is a tendency that the particle diameter of a material to be ground becomes larger with the decrease in the grinding time and the particle diameter of a material to be ground becomes smaller and the grain size distribution becomes narrower with the increase in the grinding time.

From the viewpoint of making the above-mentioned effect of the present invention further significant, it is preferred that a crystallite size in each of the cerium oxide particles is in the range from 70 to 150 Å. The crystallite size can be adjusted by properly altering a crystallite size in a raw material powder, e.g., cerium carbonate, to be used for the production of the cerium oxide particles, or the firing conditions, e.g., the firing temperature and the firing time, to be employed in the production of the cerium oxide particles.

Each of the cerium oxide particles to be used in the present invention is composed of crystalline bodies each composed of crystal grains each having the above-mentioned crystallite size. It is preferred that each of the crystalline bodies has an anisotropic shape such as a plate-like, scale-like, rod-like or needle-like shape, rather than an approximately spherical shape. When the cerium oxide particles are composed of crystalline bodies each having an anisotropic shape as mentioned above, it becomes possible to produce a molded article having excellent strength and adsorption performance even if the content of the binder resin is small. In the present invention, it is also preferred that each of the cerium oxide particles is made from a sintered body which is composed of a plurality of crystalline bodies each having an anisotropic shape and bonded to each other three-dimensionally and randomly. A sintered body composed of various crystalline bodies each having a plate-like, scale-like, rod-like or needle-like shape and bonded to each other three-dimensionally and randomly has an indefinite shape. The shape of each of the crystalline bodies that constitute the particles and the shape of the sintered body (cerium oxide particle) that is composed of the mutually bonded crystalline bodies can be confirmed by the observation with an electron microscope.

A particle having the above-mentioned indefinite shape has a larger specific surface area than that of a particle having an approximately spherical shape and having the same size as that of the aforementioned particle. Therefore, even cerium oxide particles having an average particle diameter of 1 to 15 μm can have an adsorption ability at a level equivalent to or higher than that of cerium oxide particles having an average particle diameter of less than 1 μm.

The method for producing the cerium oxide particles each having the above-mentioned specific shape is not particularly limited. For example, cerium oxide can be produced by mixing a cerium salt solution with sodium carbonate or sodium hydrogen carbonate to produce cerium carbonate and then firing the cerium carbonate. As the cerium salt solution, a cerium nitrate solution or a cerium chloride solution can be used preferably. In this regard, it is known that the shape of each of the cerium carbonate particles can be controlled by adjusting the molar ratio of carbonate ions of sodium hydrogen carbonate or sodium carbonate to cerium ions. For example, Japanese Patent Laid-Open No. 2012-041202 teaches that plate-like particles can be produced by adjusting the molar ratio of carbonate ions to cerium ions to 1:1.5 to 1:5. It is also taught that rod-like or needle-like, rather than plate-like, cerium carbonate particles can be produced by elevating the reaction temperature to be employed for the production of cerium carbonate (for example, to 40° C. or higher). Subsequently, the thus-produced cerium carbonate is placed in a container such as a sagger or a stainless steel-made tray, is then retained at a product temperature of 80 to 120° C. for 1 to 5 hours, and is then fired at a temperature of 200 to 400° C. for 3 to 20 hours. In this manner, cerium oxide particles having the above-mentioned predetermined shape can be produced. The firing may be carried out in the presence of oxygen (e.g., in air).

Binder Resin

The binder resin can bond the cerium oxide particles to each other so that the strength of the molded article can be maintained. In the present invention, since each of the cerium oxide particles has a predetermined shape as mentioned above, the amount of the binder resin in the molded article can be reduced. That is, in the present invention, the strength of the molded article can be maintained even when the cerium oxide particles are contain in an amount of 90% by mass or more relative to the whole amount of the molded article (in other words, when the content of the binder resin is less than 10% by mass). Although the reason for this phenomenon is unclear, it is considered that the crystallite sizes in the cerium oxide particles and the forms of the cerium oxide particles themselves (i.e., the sizes or shapes of the particles) are involved in the phenomenon. The content of the cerium oxide particles in the molded article is preferably 92 to 98% by mass, particularly preferably 93 to 95% by mass. In the present invention, the content of the cerium oxide particles in the molded article refers to a ratio of the mass of a residue (an ash content), which is generated after subjecting the molded article to a heating treatment at a temperature equal to or higher than the thermal decomposition temperature of the binder resin and then removing the binder resin component, relative to the whole mass of the molded article in a dried state.

The binder resin is not particularly limited, and any one can be used as long as the cerium oxide particles can be bonded to each other. Examples of the resin include a polysulfone-based polymer, a poly(vinylidene fluoride)-based polymer, a poly(vinylidene chloride)-based polymer, an acrylonitrile-based polymer, an acrylate-based polymer, a polyamide-based polymer, a polyimide-based polymer and a cellulose-based polymer.

Among the above-mentioned resins, from the viewpoint of the durability of the molded article, a resin that is hardly eluted into water and does not have biodegradability can be used preferably, and an acrylate-based polymer, a polyacrylonitrile polymer, a polysulfone polymer and a poly(vinylidene fluoride) polymer are preferred. In the case where water is used as a dispersion medium as mentioned below, it is preferred to use an aqueous emulsion of any one of the above-mentioned polymers. A polymer in the form of an aqueous emulsion can be produced by a known means such as a means for carrying out emulsion polymerization in water.

In the case where the molded article is produced by extrusion molding or the like, water is generally used as a dispersion medium. In this case, a plasticizer is sometimes added for the purpose of imparting fluidability, shape maintainability or the like. An example of the plasticizer is a water-soluble polymer, such as a cellulose ether, e.g., methyl cellulose, a polysaccharide, a polyvinyl alcohol and starch. The above-mentioned plasticizers may be used singly, or two or more of them may be used in the form of an arbitrary mixture. If necessary, a conventional dispersant or the like may also be added appropriately.

Molded Article

A molded article which contains the above-mentioned cerium oxide particles and the above-mentioned binder resin and optionally contains a plasticizer can be produced by a known method. For example, the molded article can be produced by mixing the cerium oxide particles, the binder resin and the plasticizer together and then granulating the mixture by a known technique. A porous molded article can be produced by appropriately adjusting the mixing ratio among the cerium oxide particles, the binder resin and the plasticizer in the production process. For example, the cerium oxide particles are mixed with the binder resin, the plasticizer and pure water in amounts of 3 to 20% by mass, 0.5 to 5.0% by mass and 20 to 50% by mass, respectively, relative to the amount of the cerium oxide particles. The mixing method is not particularly limited, and a known means can be employed, such as a kneader, a mixer and a high-speed stirrer. A kneaded product produced by mixing the components is granulated by extrusion granulation to produce granules, and the granules are spheronized with a spheronizer to produce a molded article having a desired size. Subsequently, the molded article is dried and optionally fired to produce a porous molded article. It is preferred that the molded article after the spheronization has an approximately columnar shape having a diameter of 0.3 to 1.0 mm and a length of 0.5 to 5.0 mm.

In the present invention, since cerium oxide particles each having the above-mentioned specific shape are used, the finished molded article can typically have a porous form in which fine pores are communicated with each other. It is more preferred that the molded article according to the present invention has a specific surface area of 100 to 200 $m^2/g$. In the present invention, the specific surface area is defined as a value determined by a BET method. Concretely, the value can be determined by adsorbing an inert gas in which the size of a single molecule is already known (e.g., a nitrogen gas) onto the surface of a sample to be measured and then determining the value from the amount of the gas adsorbed and the area occupied by the inert gas. It is more preferred that the molded article according to the present invention has an average pore diameter of 500 to 2000 nm. In the present invention, the term "average pore diameter" refers to a number average pore diameter (D50) corresponding to 50% in a cumulative pore distribution measured by a mercury intrusion method.

Use Applications of Molded Article

The molded article according to the present invention can be used preferably as an adsorbent for iodate ions. In the molded article according to the present invention, the content of the cerium oxide particles per unit mass can be increased to 90% by mass or more. Furthermore, since the specific surface area of the cerium oxide particles is large, the molded article can have superior adsorption performance compared with those of the conventional iodate ion adsorbents. In addition, since each of the cerium oxide particles has the above-mentioned specific shape, even when the content of the binder resin is reduced, it is possible to impart strength and durability to the molded article.

EXAMPLES

Hereinafter, the embodiments of the present invention will be described specifically with reference to examples. However, the present invention is not limited by these examples.

Example 1

Figure 1:
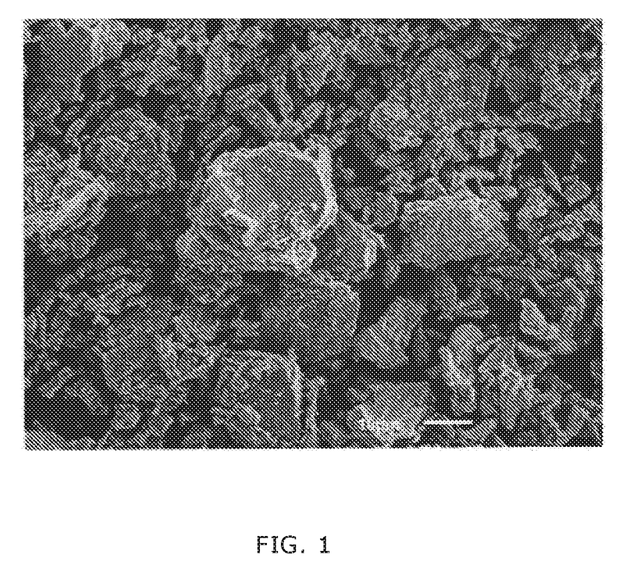
FIG. 1 is an electron micrograph of cerium oxide particles used in Example 1.

Cerium carbonate having a plate-like particle shape was retained at a product temperature of 90° C. for 2 hours using a roller hearth kiln, and was then fired while allowing the cerium carbonate to pass through a uniformly heating zone at 300° C. over 8 hours, thereby producing cerium oxide. Subsequently, the cerium oxide was mixed using a mixer to produce uniform cerium oxide particles free of firing unevenness. The electron micrograph of the cerium oxide particles is shown in FIG. 1. As apparent from the electron micrograph shown in FIG. 1, it was found that each of the cerium oxide particles was a sintered body in which various crystalline bodies having shape anisotropy including a plate-like shape, a scale-like shape, a rod-like shape and a needle-like shape were bonded to each other three-dimensionally and randomly.

One hundred parts by mass of the thus-produced cerium oxide particles, 10.7 parts by mass ((solid content):(water content)=(50% by mass):(50% by mass)) of an aqueous acrylate copolymer emulsion (Polysol AP-1761, manufactured by Showa Denko K. K.) and 0.7 part by mass of methyl cellulose (SM-4000, manufactured by Shin-Etsu Chemical Co., Ltd.) were mixed together, then pure water was added to the resultant mixture so that the total amount of the pure water and a water content in the aqueous acrylate copolymer emulsion became 30 parts by mass relative to 100 parts by mass of the cerium oxide particles, and then the resultant solution was mixed for 3 minutes using a mixer (a high-speed mixer FS200, manufactured by EARTHTECHNICA Co, Ltd.) to produce a kneaded product. Subsequently, the kneaded product was extruded into a rod-like shape through a 0.6 mm-mesh screen using an extrusion granulator (disc pelleter F-40, manufactured by DALTON Corporation), and was then spheronized using a spheronizer (Marumerizer Q-1000, manufactured by DALTON Corporation) at 150 rpm for 2 minutes to produce granules.

Figure 2:
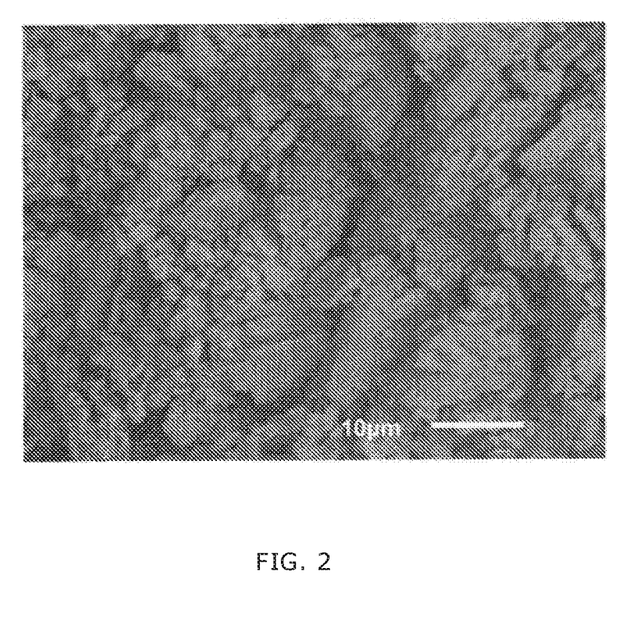
FIG. 2 is an electron micrograph of a molded article produced in Example 1.

The thus-produced granules were dried with hot air at 110° C. using a dryer (midget dryer MDD9000, manufactured by DALTON Corporation) until the water content was decreased to 3% by mass or less, and were then allowed to pass through a 1.0 mm-mesh sieve in a vibration sieve (Model 702, manufactured by DALTON Corporation), and then granules leaving on a 0.3 mm-mesh sieve were collected, which served as a molded article. The molded article had an approximately columnar shape having an average diameter of 0.6 mm and a length of 2.0 mm. The enlarged cross-sectional image (electron micrograph) of the thus-produced molded article is shown in FIG. 2. As apparent from the electron micrograph shown in FIG. 2, it was found that, in the molded article, the sintered bodies (cerium oxide particles) were bonded to each other with a small amount of the binder resin interposed therebetween and fine pores were formed between the sintered bodies.

Example 2

A molded article was produced in the same manner as in Example 1, except that the amount of the aqueous acrylate copolymer emulsion to be added was changed to 18 parts by mass and the amount of methyl cellulose to be added was changed to 2 parts by mass.

Example 3

A molded article was produced in the same manner as in Example 1, except that the amount of the aqueous acrylate copolymer emulsion to be added was changed to 7 parts by mass and the amount of methyl cellulose to be added was changed to 0.6 parts by mass.

Example 4

A molded article was produced in the same manner as in Example 1, except that the firing temperature, which was one of the conditions for the production of cerium oxide particles, was changed to 250° C.

Example 5

A molded article was produced in the same manner as in Example 1, except that the firing temperature, which was one of the conditions for the production of cerium oxide particles, was changed to 350° C.

Comparative Example 1

A molded article was produced in the same manner as in Example 1, except that spherical cerium oxide particles having an average particle diameter of 15 μm were used as the cerium oxide particles, the amount of the cerium oxide particles to be added was changed to 100 parts by mass, the amount of the aqueous acrylate copolymer emulsion to be added was changed to 54 parts by mass, and the amount of methyl cellulose to be added was changed to 3 parts by mass.

Comparative Example 2

A molded article was produced in the same manner as in Comparative Example 1, except that the amount of the aqueous acrylate copolymer emulsion to be added was changed to 18 parts by mass and the amount of methyl cellulose to be added was changed to 2 parts by mass.

Measurement of Content of Cerium Oxide Particles

Each of the molded articles thus produced was treated by heating at about 700° C. for 2 hours to remove the binder resin component contained in the molded article. The content of the cerium oxide particles in the molded article was calculated in accordance with the following equation.

Content of cerium oxide particles (% by mass)=$W/W_0 \times 100$ (wherein $W_0$ represents the mass (g) of the molded article before the heating treatment; and W represents the mass (g) of ash content after the removal of the binder resin component.)

The results of the measurements are shown in Table 1 below.

Measurement of Average Particle Diameter of Cerium Oxide Particles

Each of the molded articles thus produced was treated by heating at about 700° C. for 2 hours to remove the binder resin component contained in the molded article. The cerium oxide particles after the removal of the binder resin component was measured by a transmission method, in which ultrasonic wave was applied to the cerium oxide particles at 40 W for 180 seconds with a particle size distribution measurement device (MT-3000, manufactured by MicrotracBEL Corporation) using water as a solvent species. The results of the measurement are shown in Table 1 below.

Measurement of Crystallite Size in Cerium Oxide Particles

Figure 3:
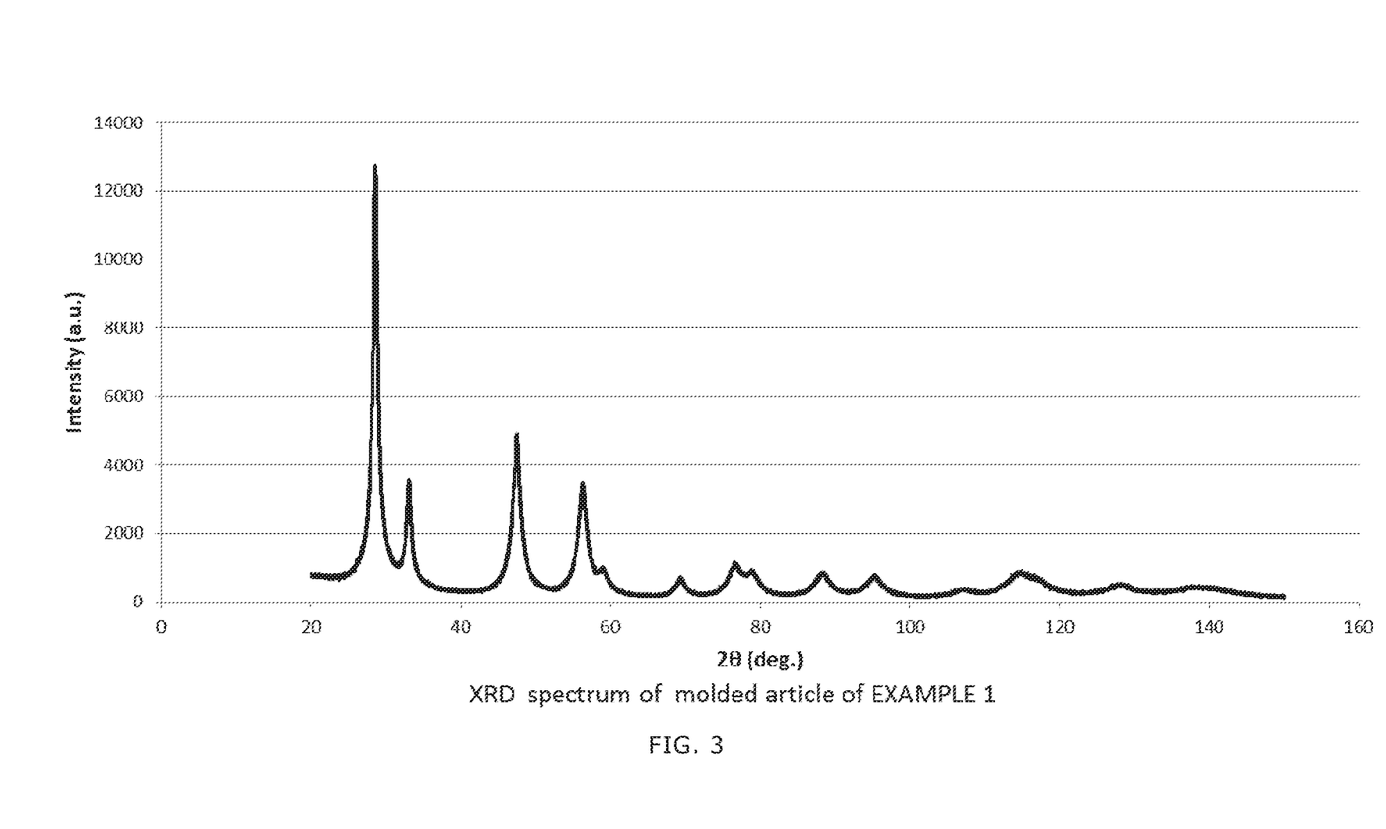
FIG. 3 is an X-ray diffraction spectrum of a molded article produced in Example 1.
Figure 4:
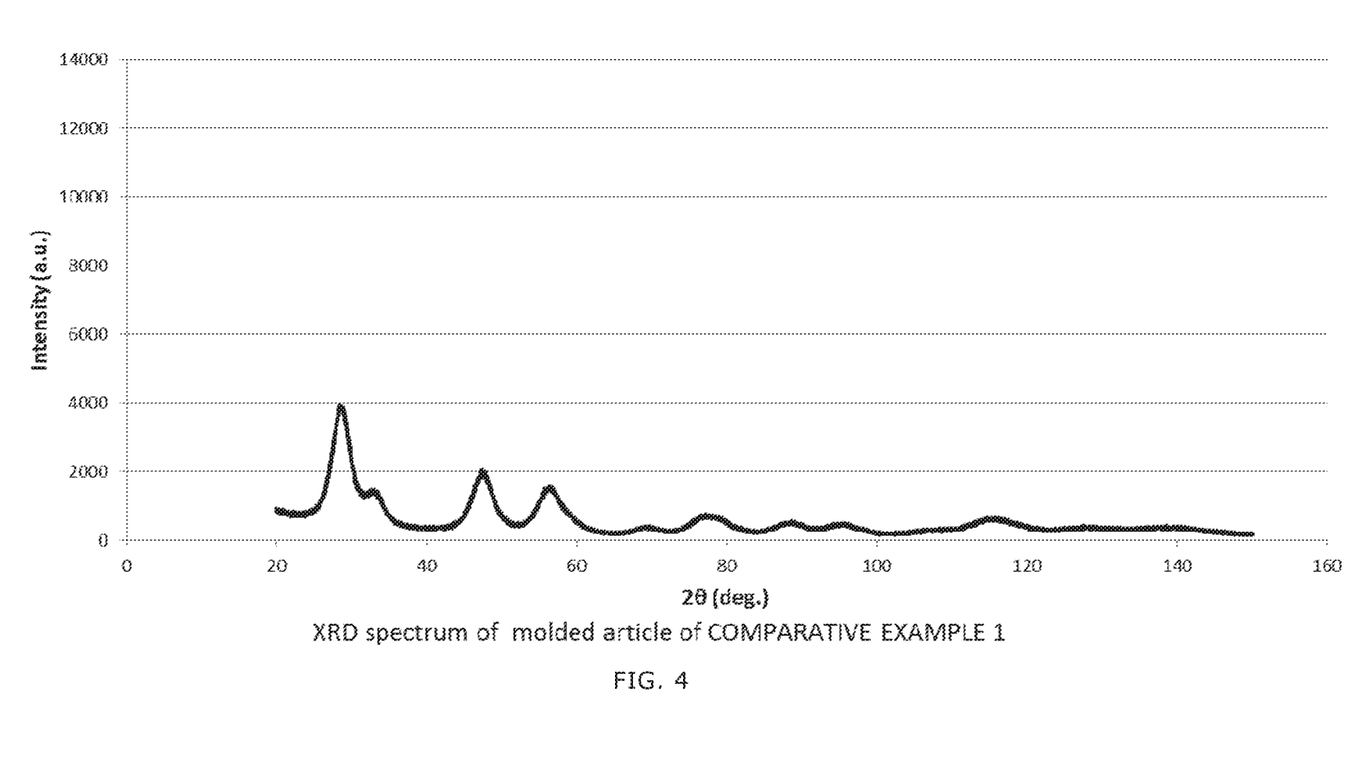
FIG. 4 is an X-ray diffraction spectrum of a molded article produced in Comparative Example 1.

With respect to the cerium oxide particles contained in each of the molded articles thus produced, each of the molded articles was ground, and was then subjected to an X-ray diffraction spectrum measurement with a powder X-ray diffraction device (RINT-TTRIII, manufactured by Rigaku Corporation) at an output of 50 kV and 300 mA, a measurement range (deg) of 20 to 150, a step width (deg) of 0.01, a scan speed (deg/min) of 1, entrance slit (deg) of ⅔ and a length limiting slit (mm) of 10 with a detector one-dimensional detector. The diffraction spectrum of the molded article of Example 1 is shown in FIG. 3. The diffraction spectrum in the molded article of Comparative Example 1 is shown in FIG. 4. A peak corresponding to cerium oxide was identified from the diffraction spectrum, and the crystallite size of cerium oxide on <111> plane was calculated from the identified peak width (half width) in accordance with the Scherrer's equation (Scherrer constant: 0.9400, corrected with NIST SRM660a (LaB6)). The results of the measurement are shown in Table 1 below.

Measurement of Specific Surface Area of Molded Article

With respect to each of the molded articles, the specific surface area was measured by a flow method using a specific surface area meter (Macsorb model-1201, manufactured by Mountech Co., Ltd.). The results of the measurement are shown in Table 1 below.

Measurement of Average Pore Diameter of Molded Article

With respect to each of the molded articles, the average pore diameter was measured using a mercury porosimeter (Autopore IV-9500, manufactured by Shimadzu Corporation). The results of the measurement are shown in Table 1 below.

Evaluation of Strength of Molded Article

One hundred grams of pure water and 10 g of each of the molded articles were introduced into a 250-mL flask, and the flask was shaken with Orbital Shaker (AS-MOR-3001, manufactured by AS ONE Corporation) at 200 rpm for 30 minutes to submerge the molded article, then the molded article was allowed to stand for 72 hours, then a steel ball having a size of φ12.7 mm (8.5 g) and a steel ball having a size of φ9.5 mm (3.6 g) were introduced into the flask, and then the flask was shaken at 180 rpm for 30 minutes. Subsequently, the content in the flask was sorted, then a substance left on a 212-μm sieve was collected, then the collected substance was dried at room temperature, and then the mass of the dried product was measured.

The durability of each of the molded articles was evaluated in accordance with the following equation.

Durability (%)=(mass (g) of dried product)/(mass (10 g) of molded article introduced)×100

The evaluation criteria were as follows:
○: durability of 95 to 100% inclusive;
Δ: durability of 90% or more and less than 95%; and
×: durability of less than 90%.
The results of the evaluation are shown in Table 1.

Evaluation of Adsorption Performance of Molded Article 0.91 gram of a sodium iodate powder (analytical grade, manufactured by Kishida Chemical Co., Ltd.) and 952 g of artificial sea water (Bluemarine, manufactured by Nihonkai-sui Co., Ltd.) were dissolved in 79.05 kg of pure water to prepare a solution containing about 10 ppm of iodate ions. The concentration of iodate ions in the solution was determined as an iodine concentration that was measured using an ICP emission spectrometer (PS3520UV DD, manufactured by Hitachi High-Tech Science Corporation) under the assumption that all of iodine elements in the solution existed in the form of iodine ions. The iodine concentration in the solution was 7 ppm.

Subsequently, the molded article was filled in a column having a volume of 10 mL, then the solution was fed into the column with a liquid delivery pump (Model MP-1100, manufactured by AS ONE Corporation) at a flow rate of 1.67 cc/min, and then the iodine concentration in the solution after being passed through the column was measured in the same manner as mentioned above.

The iodate ion removal ratio was calculated in accordance with the following equation.

Iodate ion removal ratio (%)=$(C_0-C)/C_0$×100

(wherein $C_0$ represents the iodine concentration (7 ppm) in the solution before being passed through the column; and C represents the iodine concentration in the solution after being passed through the column.)

The time that elapsed before the iodate ions removal ratio (%) became less than 90% was measured, and the adsorption performance of the molded article was evaluated in accordance with the following criteria. In the molded article of Comparative Example 2, when water was allowed to pass through the column after the molded article was filled in the column, the molded article was broken in the middle and therefore it was impossible to evaluate the adsorption performance.

○: the lapse time was 100 hours or linger;
Δ: the lapse time was 75 hours or longer and shorter than 100 hours; and
×: the lapse time was shorter than 75 hours.
The results of the evaluation are shown in Table 1 below.

TABLE 1

| | Physical properties of cerium oxide | | | | Physical properties of molded article | | Results of evaluation of molded article | | | |
|---|---|---|---|---|---|---|---|---|---|---|
| | Content (% by mass) | Average particle diameter (μm) | Crystallite size on <111> plane (Å) | Shape | Specific surface area (m²/g) | Average pore size (nm) | Evaluation on adsorption performance | | Evaluation on strength Durability | |
| | | | | | | | Lapse time (hr) | Rating | (%) | Rating |
| Ex. 1 | 94 | 4 | 100 | indefinite | 140 | 500 | 130 | ○ | 95 | ○ |
| Ex. 2 | 90 | 4 | 100 | indefinite | 140 | 520 | 100 | ○ | 100 | ○ |
| Ex. 3 | 96 | 4 | 100 | indefinite | 140 | 500 | 135 | ○ | 91 | Δ |
| Ex. 4 | 94 | 1 | 70 | indefinite | 150 | 670 | 120 | ○ | 94 | Δ |
| Ex. 5 | 94 | 10 | 150 | indefinite | 100 | 500 | 95 | Δ | 96 | ○ |

TABLE 1-continued

| | Physical properties of cerium oxide | | | | Physical properties of molded article | | Results of evaluation of molded article | | | |
|---|---|---|---|---|---|---|---|---|---|---|
| | Content (% by mass) | Average particle diameter (μm) | Crystallite size on <111> plane (Å) | Shape | Specific surface area (m²/g) | Average pore size (nm) | Evaluation on adsorption performance | | Evaluation on strength Durability | |
| | | | | | | | Lapse time (hr) | Rating | (%) | Rating |
| C. Ex. 1 | 77 | 15 | 30 | spherical | 60 | 450 | 60 | x | 100 | ○ |
| C. Ex. 2 | 90 | 15 | 30 | spherical | 75 | 440 | measurement was impossible | x | 20 | x |

The invention claimed is:

1. A molded article comprising cerium oxide particles and a binder resin that bonds the cerium oxide particles to one another, wherein an average particle diameter of the cerium oxide particles is 4 to 15 μm and a crystallite size in each of the cerium oxide particles is 40 to 200 Å and the cerium oxide particles are composed of crystalline bodies having an anisotropic shape selected from the group consisting of a plate-like shape, a scale-like shape, a rod-like shape and a needle-like shape, and wherein the binder resin comprises at least one polymer selected from the group consisting of polysulfone polymers, poly(vinylidene fluoride) polymers, poly(vinylidene chloride) polymers, acrylonitrile polymers, acrylate polymers, polyamide polymers, polyimide polymers and cellulose polymers.

2. The molded article according to claim 1, wherein each of the cerium oxide particles is a sintered body in which a plurality of crystalline bodies each having shape anisotropy is bonded to each other three-dimensionally and randomly.

3. The molded article according to claim 2, wherein the cerium oxide particles are contained in an amount of 90% by mass or more relative to the whole amount of the molded article.

4. The molded article according to claim 2, wherein the molded article has a specific surface area of 100 to 200 m²/g.

5. The molded article according to claim 2, wherein the molded article has an average pore diameter of 500 to 2000 nm.

6. The molded article according to claim 2, wherein the molded article can be used as an adsorbent for iodate ions.

7. The molded article according to claim 1, wherein the cerium oxide particles are contained in an amount of 90% by mass or more relative to the whole amount of the molded article.

8. The molded article according to claim 7, wherein the molded article has a specific surface area of 100 to 200 m²/g.

9. The molded article according to claim 7, wherein the molded article has an average pore diameter of 500 to 2000 nm.

10. The molded article according to claim 7, wherein the molded article can be used as an adsorbent for iodate ions.

11. The molded article according to claim 1, wherein the molded article has a specific surface area of 100 to 200 m²/g.

12. The molded article according to claim 11, wherein the molded article has an average pore diameter of 500 to 2000 nm.

13. The molded article according to claim 11, wherein the molded article can be used as an adsorbent for iodate ions.

14. The molded article according to claim 1, wherein the molded article has an average pore diameter of 500 to 2000 nm.

15. The molded article according to claim 1, wherein the molded article can be used as an adsorbent for iodate ions.

* * * * *